(12) United States Patent
Trenholm et al.

(10) Patent No.: US 10,176,588 B2
(45) Date of Patent: Jan. 8, 2019

(54) SYSTEM AND METHOD FOR SPECULAR SURFACE INSPECTION

(71) Applicant: SIGHTLINE INNOVATION INC., Toronto (CA)

(72) Inventors: Wallace Trenholm, Toronto (CA); Maithili Mavinkurve, Markham (CA); Mark Alexiuk, Winnipeg (CA); Jason Cassidy, Hamilton (CA)

( * ) Notice: Subject to any disclaimer, the term of this patent is extended or adjusted under 35 U.S.C. 154(b) by 80 days.

(21) Appl. No.: 15/265,161

(22) Filed: Sep. 14, 2016

(65) Prior Publication Data

US 2017/0132801 A1    May 11, 2017

Related U.S. Application Data

(60) Provisional application No. 62/218,075, filed on Sep. 14, 2015.

(51) Int. Cl.
*G06K 9/60*     (2006.01)
*G06T 7/514*    (2017.01)
(Continued)

(52) U.S. Cl.
CPC .............. *G06T 7/514* (2017.01); *G06T 5/002* (2013.01); *G06T 5/50* (2013.01); *G06T 7/0004* (2013.01);
(Continued)

(58) Field of Classification Search
CPC .... G01S 13/867; G01S 13/90–13/9094; G06T 2207/10044; G06T 2207/30156;
(Continued)

(56) References Cited

U.S. PATENT DOCUMENTS 4,920,385 A    4/1990 Clarke et al.
5,142,648 A    8/1992 Fitts et al.
(Continued)

FOREIGN PATENT DOCUMENTS

EP    2063260 A1    5/2009

OTHER PUBLICATIONS

Zoltan Sarosi et al., "Detection of surface defects on sheet metal parts by using one-shot deflectometry in the infrared image", InfraMation 2010 Proceedings, ETHzurich Research Collection, conference paper, published in 2010, 11 pages total (Year: 2010).*

(Continued)

*Primary Examiner* — Brian Werner
(74) *Attorney, Agent, or Firm* — Bhole IP Law; Marc Lampert; Anil Bhole

(57) ABSTRACT

Embodiments described herein relate to systems and methods for specular surface inspection, and particularly to systems and methods for surface inspection comprising inverse synthetic aperture imaging ("ISAI") and specular surface geometry imaging ("SSGI"). Embodiments may allow an object under inspection, to be observed, imaged and processed while continuing to be in motion. Further, multiple optical input sources may be provided, such that the object does not have to be in full view of all optical sensors at once. Further, multi-stage surface inspection may be provided, wherein an object under inspection may be inspected at multiple stages of an inspection system, such as, for an automotive painting process, inspection at primer, inspection at paint, inspection at final assembly. SSGI imaging modules are also described for carrying out microdeflectometry.

23 Claims, 12 Drawing Sheets

(51) Int. Cl.
  *G06T 5/00* (2006.01)
  *G06T 5/50* (2006.01)
  *G06T 7/00* (2017.01)
  *H04N 5/369* (2011.01)
  *H04N 5/372* (2011.01)

(52) U.S. Cl.
  CPC ......... *G06T 7/0008* (2013.01); *H04N 5/3692* (2013.01); *H04N 5/372* (2013.01); *G06T 2207/20024* (2013.01); *G06T 2207/20056* (2013.01); *G06T 2207/20081* (2013.01); *G06T 2207/20084* (2013.01); *G06T 2207/20221* (2013.01); *G06T 2207/30156* (2013.01)

(58) Field of Classification Search
  CPC ......... G06T 7/0004–7/001; G06T 5/50; G06T 2207/20221; G06T 7/514; G01N 29/069; G01B 11/25–11/2545; G01B 11/303; G01M 11/0278; G01M 11/005
  See application file for complete search history.

(56) References Cited

U.S. PATENT DOCUMENTS

| | | | |
|---|---|---|---|
| 5,666,197 A * | 9/1997 | Guerra | B82Y 10/00 356/512 |
| 6,714,831 B2 | 3/2004 | Matthews et al. | |
| 8,224,060 B2 | 7/2012 | Asada et al. | |
| 8,224,066 B2 | 7/2012 | Haeusler | |
| 2009/0185182 A1* | 7/2009 | Kim | G01N 21/55 356/302 |
| 2011/0090110 A1* | 4/2011 | Tralshawala | G01N 22/02 342/25 A |
| 2011/0169687 A1* | 7/2011 | Buyukozturk | G01S 7/41 342/25 F |

OTHER PUBLICATIONS

Gerd Hausler, Claus Richter, Karl-Heinz Leitz, and Markus C. Knauer; Microdeflectometry—a novel tool to acquire 3D microtopography with nanometer height resolution; Opt. Lett. (4), 396-398 (2008).
Peng Su, Robert E. Parks, Lirong Wang, Roger P. Angel, and James H. Burge; Software configurable optical test system: a computerized reverse Hartmann test; Applied Optics vol. 49, Issue 23, pp. 4404-4412 (2010).
Run Huang, Peng Su, Robert Parks, James H. Burge, Guido Brusa and Mourad Idir; Measuring aspheric surfaces with reflection deflectometry; Sep. 18, 2013, SPIE Newsroom.
Lirong Wang, Peng Su, Robert Parks, Roger Angel, Jose Sasian, et al.; "A low-cost, flexible, high dynamic range test for free-form illumination optics", Proc. SPIE 7652, International Optical Design Conference 2010, 76521H (Sep. 8, 2010).
Soren Kammel and Fernando Puente Leon; Deflectometric Measurement of Specular Surfaces; IEEE Transactions on Instrumentation and Measurement , vol. 57 No. 4, Apr. 2008.
Zoltan Sarosi, Wolfgang Knapp, Andreas Kunz, Konrad Wegenerz; Detection of Surface Defects on Sheet Metal Parts Using One-Shot Deflectometry in the Infrared Range; FLIR Technical Series, Application Note for Research and Science; IWF, ETH Zurich, Switzerland.
Ivo Ihrke, Kyros Kutulakos, Hendrik PA Lensch, Marcus Magnor, Wolfgang Heidrich; State of the Art in Transparent and Specular Object Reconstruction; EUROGRAPHICS 2008 STAR—State of the Art Report, 2008.
Jonathan Balzer, Sebastian Hofer, Jugen Beyerer; Multiview specular stereo reconstruction of large mirror surfaces; Proceedings / CVPR, IEEE Computer Society Conference on Computer Vision and Pattern Recognition. IEEE Computer Society Conference on Computer Vision and Pattern Recognition; Jun. 2011.
Josep Tornero, Leopoldo Armesto, Nicolas Montes, Marta C. Mora, Alvaro Herraez; Quality Control of Car-Bodies Based on Artificial Vision; Design and Manufacturing Institute (IDF) Universidad Politécnica de Valencia CPI, edif. 8E, Camino de Vera, s/n, 46022 Valencia (Spain).
C. Richter, M. Kurz, M. C. Knauer, C. Faber, E. Olesch, G. Hausler, D. Oberschmidt, Jorg Ebmann, E. Uhlmann; Machine-Integrated Measurement of Specular Free-Formed Surfaces Using Phase-Measuring Deflectometry; Proceedings of the euspen International Conference—San Sebastian—Jun. 2009.
Jonathan Balzer, Daniel Acevedo-Feliz, Stefano Soatto, Sebastian Hofer, Markus Hadwiger, Jurgen Beyerer; Cavlectometry: Towards Holistic Reconstruction of Large Mirror Objects; Proceeding 3DV'14 Proceedings of the 2014 2nd International Conference on 3D Vision—vol. 01; Sep. 2014.
Markus C. Knauer, Jurgen Kaminski and Gerd Hausler; Phase Measuring Deflectometry: a new approach to measure specular free-form surfaces; Proc. SPIE 5457, Optical Metrology in Production Engineering, 366 (Sep. 10, 2004).
Sengfu Wang and Seiji Inokuchi; Determining Shape of Specular Surfaces; The 8th Scandinavian Conference on Image Analysis, Tromso, Norway, May 25-28, 1993.
Hannes Loferer; Automatic painted surface inspection and defect detection; Micro-Epsilon Messtechnik; Sep. 2010.
Lei Huang, Chi Seng Ng, and Anand Krishna Asundi; Dynamic three-dimensional sensing for specular surface with monoscopic fringe reflectometry; Opt. Express 19, 12809-12814 (2011).
D. Soukup and R. Huber-Mork; Convolutional Neural Networks for Steel Surface Defect Detection from Photometric Stereo Images; ISVC 2014, Part I, LNCS 8887; 2014.
Jurgen Kaminski, Svenja Lowitzsch, Markus C. Knauer, Gerd Hausler; Full-Field Shape Measurement of Specular Surfaces; Fringe 2005: The 5th International Workshop on Automatic Processing of Fringe Patterns; Springer-Verlag Berlin Heidelberg, 2006.
Holger H. Rapp; Reconstruction of Specular Reflective Surfaces using Auto-Calibrating Deflectometry; KIT Scientific Publishing, Karlsruhe; 2013.
Wansong Li, Jan Burke; Highly accurate surface reconstruction for deflectometry; in Proceedings of the 113th Annual Meeting of the DGaO, A23 (DGaO, Eindhoven, 2012).
Christian Rottinger, Christian Faber, Martin Kurz, Evelyn Olesch, Gerd Hausler, Eckart Uhlmann; Deflectometry for Ultra-Precision Machining—Measuring without Rechucking; Proc. DGaO 112, P28 (2011).
J. Burke, W. Li, A. Heimsath, C. Von Kopylow, R. B. Bergmann; Qualifying parabolic mirrors with deflectometry; Journal of the European Optical Society 8 (2013), Art. 13014, 6 pp.

\* cited by examiner

Stage 1                    Stage 2

SYSTEM AND METHOD FOR SPECULAR SURFACE INSPECTION

TECHNICAL FIELD

The present disclosure relates generally to specular surface inspection and more specifically to surface inspection comprising specular surface geometry imaging.

BACKGROUND

Surface inspection is important in a broad range of fields, including manufacturing. A common goal of surface inspection is to detect surface defects or irregularities of an imaged object. Surface inspection may be carried out manually or by automatic processes.

Specular surfaces are especially difficult to manually inspect for visual defects. Automated methods of specular surface inspection may consist of employing deflectometry techniques, which may require a target object—regardless of specularity—to be motionless for a certain time period, such as more than ten seconds, while a known light pattern is projected upon the surface. Currently the sensing system (i.e. camera or other optical sensor) must grab a sufficient number of frames of the object in full view to accurately perform geometry based imaging. Without this, these systems may suffer from perspective deformation.

In the manufacturing context, inaccurate inspection leads to wasted product, wasted time and adds to manufacturing inefficiencies. Manufacturing environments, including automotive processes are prone to surface defects. For example, paint processes encounter numerous paint defects such as paint sags, dirt, spits and 'orange peeling'—regardless of precautions taken to ensure the cleanliness of the painting area. Defects on the painted surface of a vehicle are not acceptable to consumers. Paint inspection of a full vehicle requires extensive human inspection which may be prone to human error. Automated methods of specular surface inspection may be used, whereby a vehicle may be required to be stationary for ten seconds or more during imaging. This can be disruptive to the flow of the vehicles through a manufacturing plant, affect production output and require particular staffing and maintenance requirements. Additionally, most current specular imaging systems require that the location of any defect be known relative to the geometry of a car, which may necessitate the use of computer-aided drafting ("CAD") models.

SUMMARY

In one aspect a surface inspection system for imaging an object in motion is provided, the system comprising: an inverse synthetic aperture module for generating imaging data comprising a one-dimensional swath of pixels for the object; a specular surface geometry imaging module for generating imaging data comprising a specular reflection of the object; and a computing device for: aggregating the imaging data, denoising the imaging data, and determining the presence or absence of a surface defect in the imaging data.

In another aspect, a system for pathogen detection is provided, the system comprising: a collector having a specular surface for collecting a sample; a specular surface geometry imaging module for performing microdeflectometry on the specular surface of the collector, comprising: a patterned light emitting panel; and a charge-coupled device for generating a detection signal relating to a specular reflection of the patterned light emitting panel off of the assembly; and a computing device for analyzing the detection signal.

These and other aspects are contemplated and described herein. It will be appreciated that the foregoing summary sets out representative aspects of systems, methods, apparatuses for in situ electrochemical imaging to assist skilled readers in understanding the following detailed description.

DESCRIPTION OF THE DRAWINGS

A greater understanding of the embodiments will be had with reference to the Figures, in which.

DETAILED DESCRIPTION

Figure 1:
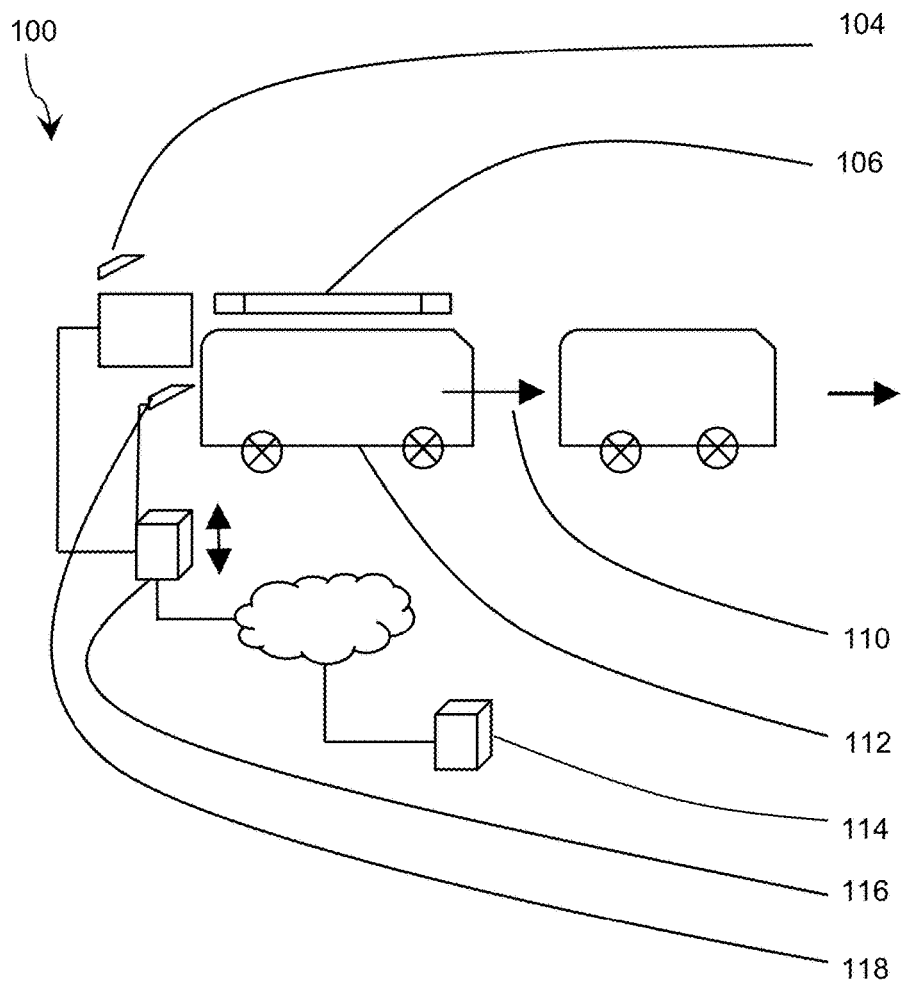
FIG. 1 shows a system for surface inspection comprising inverse synthetic aperture imaging ("ISAI") and specular surface geometry imaging ("SSGI") modules for vehicles in motion along an automobile manufacturing paint line.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical discs, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

A number of challenges exist for optical detection systems that attempt to perform surface topography, geometry and anomaly imaging tasks, some of which have been described above.

Embodiments described herein relate to systems and methods for specular surface inspection, and particularly to systems and methods for surface inspection comprising inverse synthetic aperture imaging ("ISAI") and specular surface geometry imaging ("SSGI"). Embodiments may allow an object under inspection to be observed, imaged and processed while continuing to be in motion. Further, multiple optical input sources may be provided, such that the object does not have to be in full view of all optical sensors at once. CAD models or other similar model for determining defect location or expected reflectivity may not be required. Further, embodiments described herein may prevent an inspection system from suffering from perspective deformation while the object is in motion across partial views and multiple frames using software based pushbroom and multi frame image aggregation techniques. Further, multi-stage surface inspection may be provided, wherein an object under inspection may be inspected at multiple stages of an inspection system, such as, for an automotive painting process, inspection at primer, inspection at paint, inspection at final assembly. Other analogous applications would be clear to a person of skill in the art and are contemplated herein.

A cloud-based platform may be communicatively linked to the described systems in order to enable services, such as reporting and analysis across multiple facilities (imaging locations). Further, the cloud-based platform may provide additional computational resources to facilitate the implementation of deep learning methods.

Embodiments address detection at various measurement scales including mm, pm and nm scales by varying imaging techniques. Embodiments described herein are differently configured depending on whether the imaging module of a particular implementation has a resolution above the diffraction limit of its optics, as in FIGS. 1 to 8, or at or below the diffraction limit, as in FIGS. 9 to 11. Exemplary systems operating above the diffraction limit include car defect detection, paint detection, and various other surface detection systems in the manufacturing context. For systems above the diffraction limit, as in FIGS. 1 to 8, the system uses ISAI and SSGI through the integration of multiple frames from multiple perspectives and inputs. For systems below the diffraction limit, as in FIGS. 9 to 11, the described systems may be adapted by making use of nano-SSGI and may not require the use of ISAI. Exemplary systems operating below the diffraction limit include biological sample surface inspection for the detection of a desired substance, such as a pathogen or indicators of the presence of the pathogens.

Referring now to FIG. 1, shown therein is a system 100 for surface inspection. The system 100 comprises an imaging module, a computing module, and an object under inspection 112, such as the illustrated vehicle moving along a direction of motion 110. Generally, in use, the imaging module operates to image the object under inspection in order to generate imaging data.

The imaging module comprises an ISAI module 118 and a SSGI module 104, each comprising imaging sensors for imaging the object under inspection 112 in order to generate imaging data. The computing module comprises a local computing module 116 which may be communicatively linked to a remote computing module 114. The computing module may be used for processing and analysis of imaging data provided by the imaging module. Further, the remote computing module 114 may host a user-accessible platform for invoking services, such as reporting and analysis services, and for providing computational resources to effect machine learning techniques. The illustrated system further comprises a reference bar 106 for use in analysis and/or calibration of imaging data, the reference bar having known positioning and dimensions. The reference bar 106 may also provide a reference for use in determining the relative positioning of imaging data along the object 112.

Figure 3:
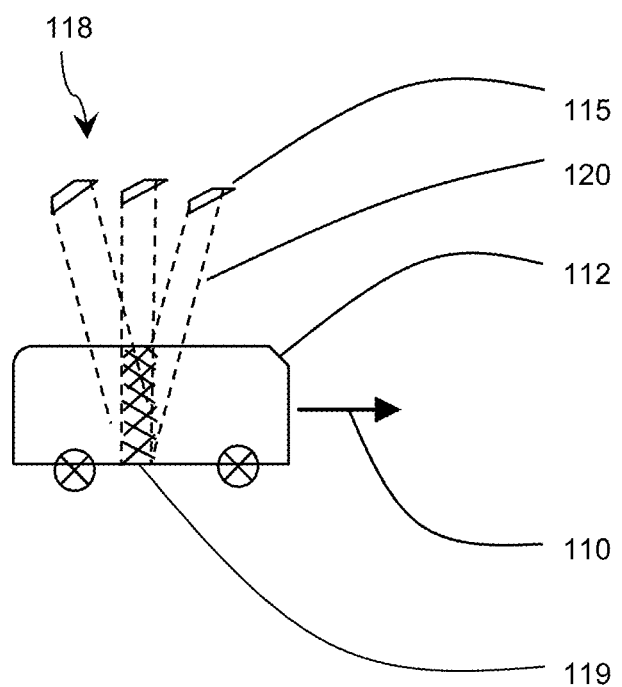
FIG. 3 shows an ISAI module.
Figure 4:
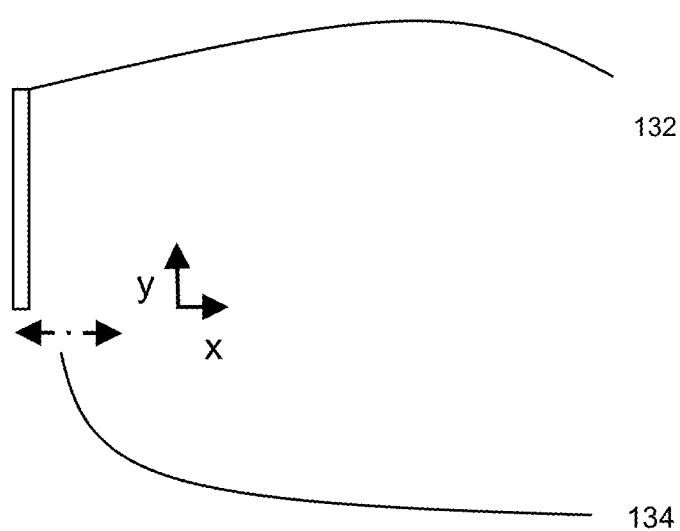
FIG. 4 shows example imaging data collected by the ISAI module of FIG. 3.

Referring now to FIGS. 3 to 4, shown in FIG. 3 is an embodiment of ISAI module 118. The ISAI module 118 may comprise a software-based slit imaging sensor mechanism to generate a 'swath' of imaging data to be provided to computing module 116. More particularly, a software-based pushbroom technique may be employed to capture a small slit of a frame, instead of the whole frame. The ISAI module 118 comprises one or more imaging sensors 115, each for generating imaging data of a swath of the object 112 while it is in motion, as illustrated by scan lines 120 and the swaths illustrated by element 119. Accordingly, as compared to synthetic aperture imaging, in the illustrated embodiment the imaged object is in motion instead of the imaging sensor, such that the embodiment relates to 'inversed' synthetic aperture imaging. The motion of the object during imaging generates a large 'synthetic' aperture for each imaging sensor 115, wherein images from a swath are combined according to signal processing techniques. Combining a swath may comprise stacking images either vertically or horizontally. As illustrated, a plurality of imaging sensors 115 may be positioned to provide multiple perspectives of the object 112. As illustrated in FIG. 4, imaging data from each imaging sensor 115 of the ISAI module comprises a plurality of one-dimensional pixel arrays 132, one pixel thick in an x dimension, referred to individually as 'swath'. The characteristics of the pixels in the imaging data may relate to the surface topography of the object under inspection. As will be appreciated from the following, the x dimension 134 of imaging data may be provided as a result of synthesizing imaging data from individual swaths. Synthesizing the data may include stacking the images from multiple cameras, providing a similar effect to a 'bug eye'/'compound eye'.

In an embodiment, the ISAI module comprises a transmitter for transmitting pulses of electromagnetic waves, and a processor configured for processing received signals. In some variations the transmitter emits pulses of radio waves, and may be a stable, coherent transmitter. Further, the ISAI module has knowledge of the path and/or velocity of the object being imaged. Reception of reflected signals may be increased through use of electronic amplifiers or other signal processing techniques. The ISAI module may use the flight or movement path of the object to simulate an extremely large antenna or aperture electronically, generating high resolution remote sensing imaging. Over time as scanning is performed, individual transmit-receive cycles are completed and the data from each cycle is stored electronically (on the processor). After a given number of cycles, the stored data can be recombined to create a high resolution image of the target. Particularly, the ISAI module uses an antenna in time-multiplex wherein the different geometric positions of the antenna elements are a result of the moving target object. The processor of the ISAI module may store the returned radar signal as amplitudes and phases for a given time period, T, from a plurality of positions of the target object (e.g. positions A to D). A signal can be reconstructed from this information, obtained by an antenna of length (v)×(T) wherein v is the speed of the target object and T is the given time period. As the line of sight direction changes along the object path, a synthetic aperture can be produced by signal processing that has the effect of lengthening the antenna. As the target object first enters the emitted beam from the transmitter, the backscattered reflections/echoes from each transmitted pulse can be recorded. As the target object continues to move, the backscattered reflections from the target object for each pulse can be recorded during the length of time that the target object is within the transmitted beam. The point at which the target object leaves the view of the emitted beam determines the length of the synthesized antenna.

Figure 5:
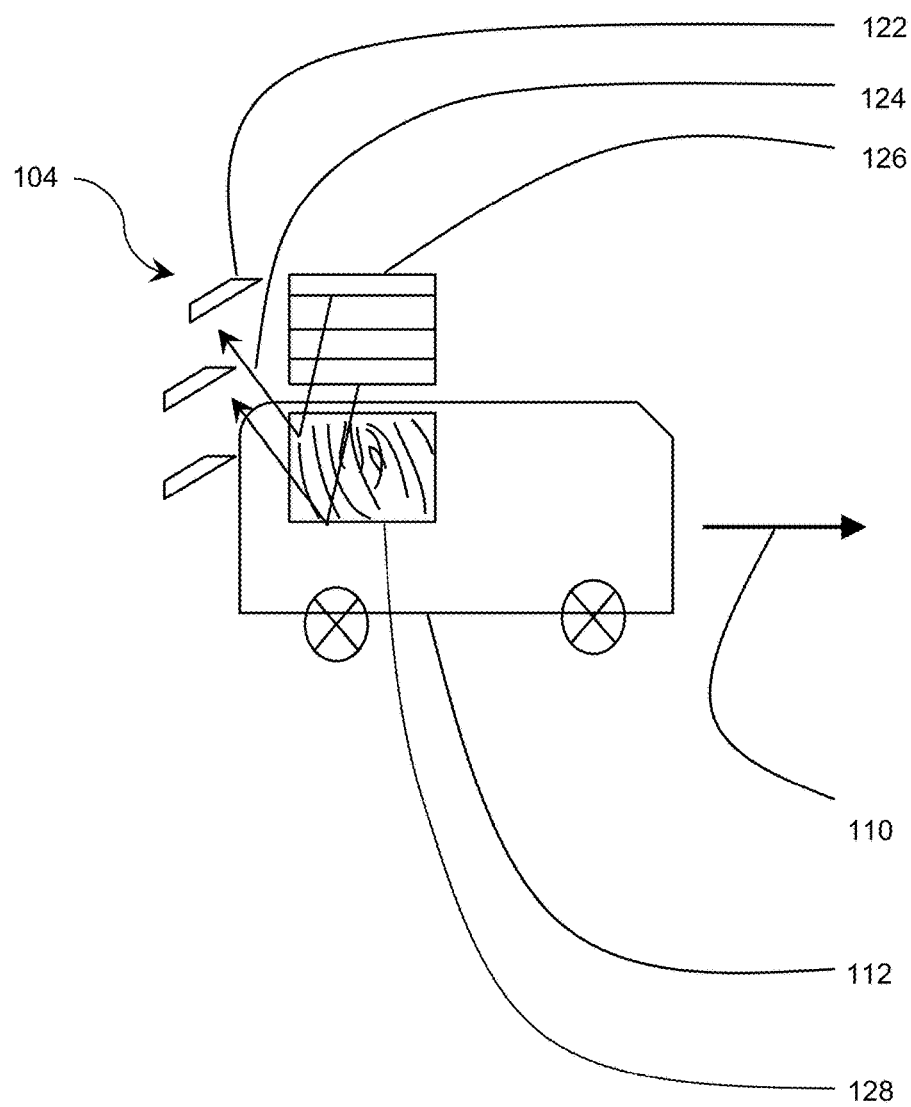
FIG. 5 shows an example SSGI module.
Figure 6:
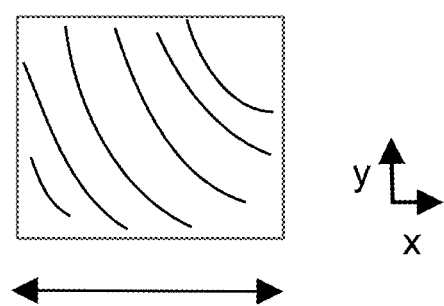
FIG. 6 shows example imaging data collected by the SSGI module of FIG. 5.

Referring now to FIGS. 5 to 6, shown in FIG. 5 is an embodiment of an SSGI module 104. FIG. 6 shows example imaging data from the SSGI module. The SSGI module 104 comprises one or more imaging sensors 122, and a patterned light emitting screen/panel 126 for carrying out deflectometry imaging of the specular surface of object 112 while it is in motion. The imaging sensors 122 generate imaging data relating to reflected light 124 from a specular reflection 128 on the surface of object 112, the specular reflection relating to the patterned light emitting screen/panel 126. Accordingly, the imaging data, illustrated in FIG. 6, relates to a two dimensional specular reflection of the patterned light emitting screen/panel 126. Once generated, imaging data may be provided to the computing module 116.

Figure 2:
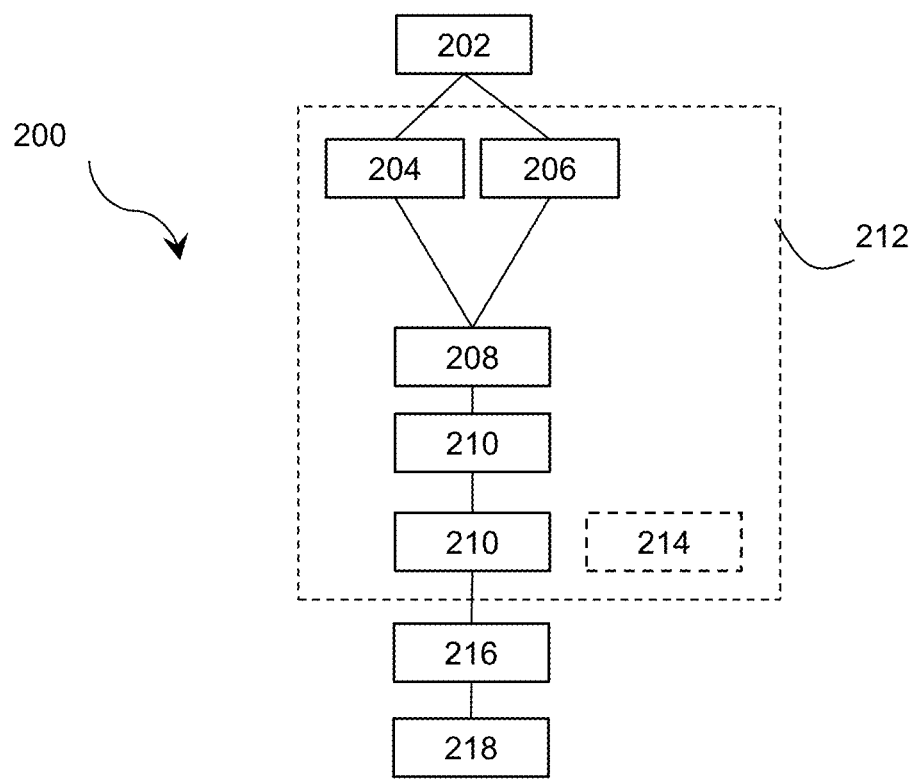
FIG. 2 shows a method of surface inspection for the system of FIG. 1.

Referring now to FIG. 2, shown therein is a method of specular surface inspection using the system 100. The method may be used for determining the geometry of specular surfaced objects when in motion, in particular for the purposes of detecting surface defects or for detecting anomalies in geometry or surface deformation. The method may further determine the relative location of any determined defects. The method aggregates synthetic aperture imaging data, and fringe pattern analysis of SSGI imaging data, in addition to object motion compensation techniques.

According to a method 200, at block 202, the ISAI module 118 and SSGI module 104 image object 112 while it is in motion and the ISAI module 118 and SSGI module 104 remain stationary.

At block 204, the computing module 116 receives imaging data from the ISAI module's imaging sensors 115, the imaging data comprising 1-dimensional arrays of pixels of object 112.

At block 206, the computing module 116 receives imaging data from the SSGI module 104 comprising two dimensional deflectometry imaging data to which reflection analysis techniques may be applied. The deflectometry imaging data may be processed in order to determine the object's surface topography. More particularly, mathematical and geometric calculations may be carried out on the SSGI imaging data. Numerical integration may be carried out in order to determine the slope of the surface under inspection in view of a phase field manifested in the imaging data, and the known configuration of the pattern light emitting screen/panel 126. Fourier transforms may be applied to transform the imaging data from the time to the frequency domain, in part to simplify data manipulation and analysis. Generally, a pattern of deviations may be more easily seen in a different domain. Whereas stripe patterns may be shown in the time domain, repetition can be more clearly seen in the frequency domain.

Figure 7:
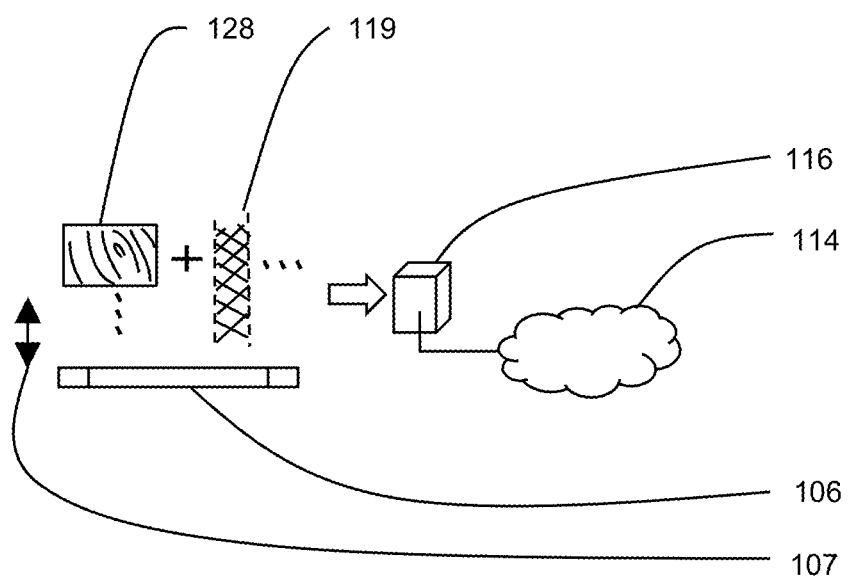
FIG. 7 shows aggregation of imaging data collected by the system of FIG. 1.

At block 208, illustrated in FIG. 7, the computing module 116 aggregates the imaging data from the ISAI module and SSGI module generated at blocks 204 and 206. The aggregation compensates for limitations of the one dimensional ISAI image data, producing less noisy one dimensional arrays.

At block 210, the one dimensional arrays from multiple imaging sensors 115, may be synthesized in order to generate a complete swath of the object under inspection 112. Accordingly, the computing module consolidates the multiple frames of imaging data, providing multiple imaging data inputs from different perspectives. The image reconstruction may involve stacking swath images from multiple imaging sensors to provide a complete swath, as though taken from a compound eye pushbroom sensor.

As illustrated by block 212, denoising may be carried out at various blocks of method 200. Denoising may include motion compensation for the imaging data. Motion compensation may comprise determination of a motion vector 107 relating to motion of the object 112 during imaging, and compensation for any distortion or defects computed to be introduced by the determined motion of the object as indicated by the motion vector 107. The motion vector 107 may be determined using sensor readings from an accelerometer coupled to the object 112, dimensional information of the SSGI imaging data, and through analysis of imaging data relating to the reference bar 106. Denoising may also include the application of image stabilization mechanisms and techniques. In addition to denoising, other image processing techniques may be applied including applying Fourier transforms, wavelet transforms, applying filters, thresholding and edge detection techniques to imaging data.

Figure 8:
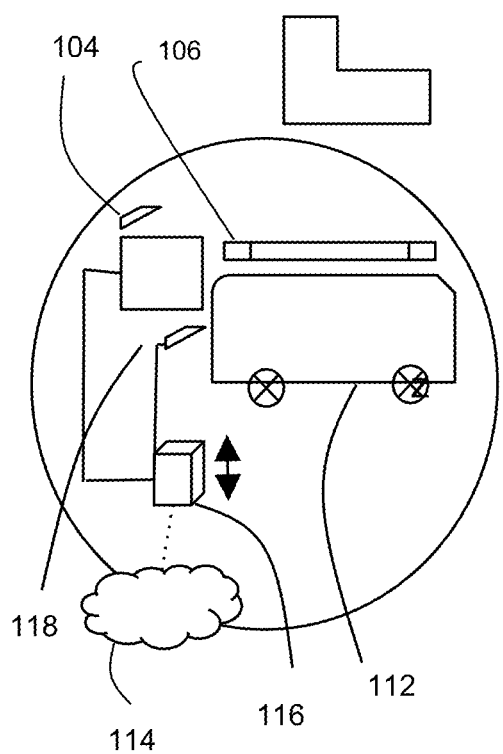
FIG. 8 shows surface inspection at multiple stages of a manufacturing process.
Figure 8:
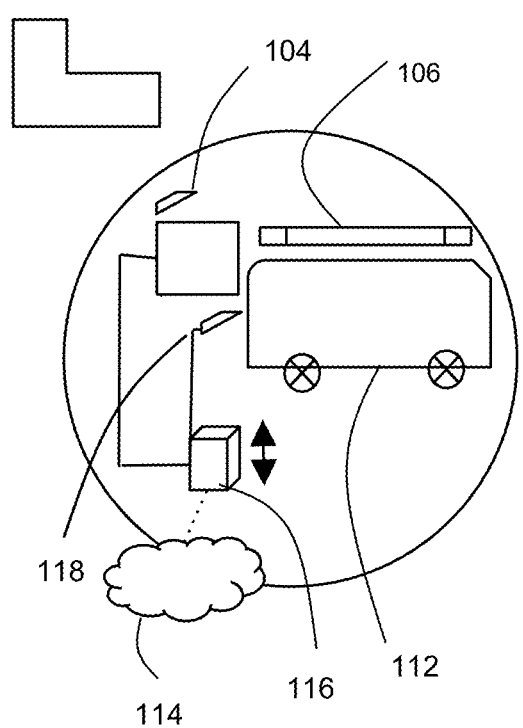

At block 214, optionally, imaging data may be received from different stages of a multi-stage surface inspection, as illustrated in FIG. 8. For example, in the manufacturing context, imaging data may be received from different stages of a painting process. The imaging data from multiple stages may be cross-correlated in order to more accurately determine the presence of surface defects. For example, the presence or absence of a surface defect at one stage of inspection for a particular area of an object, may be cross-correlated to measurements of the same area of the object at a different stage in order to generate a global value indicating the likelihood of the presence of a surface defect at the imaged area.

At block 216, once the imaging data is aggregated, it may be analysed in order to determine the presence of any surface defects. In addition, the determined motion vector 107 may be used for the determination of the relative position of any determined surface defects on the surface of the object, optionally with reference to the reference bar. The relative position of a surface defect may be used for remediation efforts.

At block 218, an output may be generated in response to the determination of surface defects designating the presence or absence of surface defects, as well as optionally the location of such defects on the object 112. Further, the output may effect a state change in a workflow operating using operational states, in a manner similar to a finite state machine. For example, an output indicating the absence of surface defects during a paint inspection workflow state may be processed by the computing module and may cause a change of operational states, which may result in the vehicle under inspection entering a different manufacturing stage in an assembly line.

Figure 9:
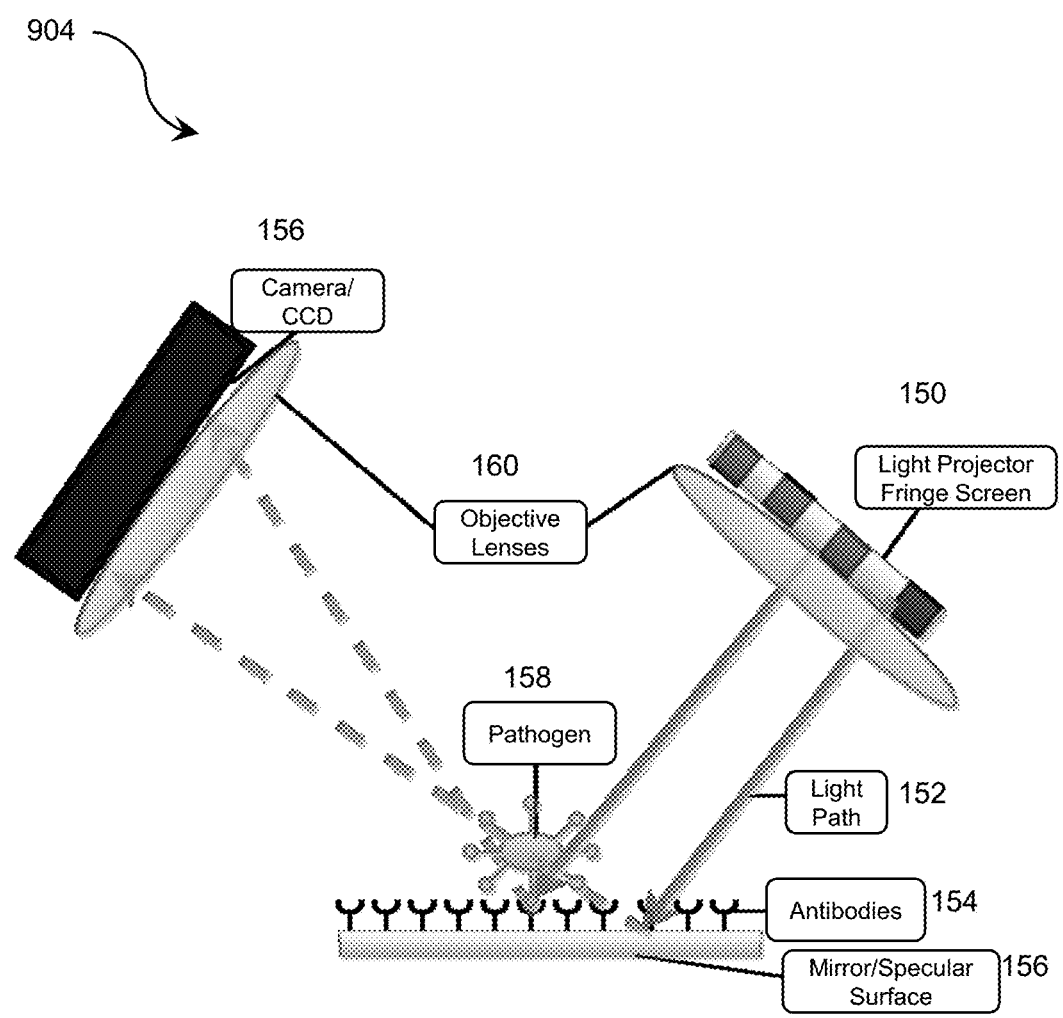
FIG. 9 shows an SSGI module configured to effect micro-deflectometry.
Figure 10:
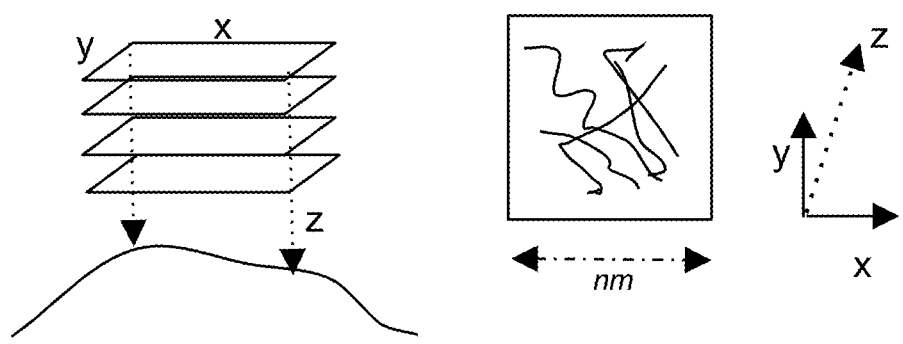
FIG. 10 shows example imaging data collected by the SSGI module of FIG. 9.
Figure 11:
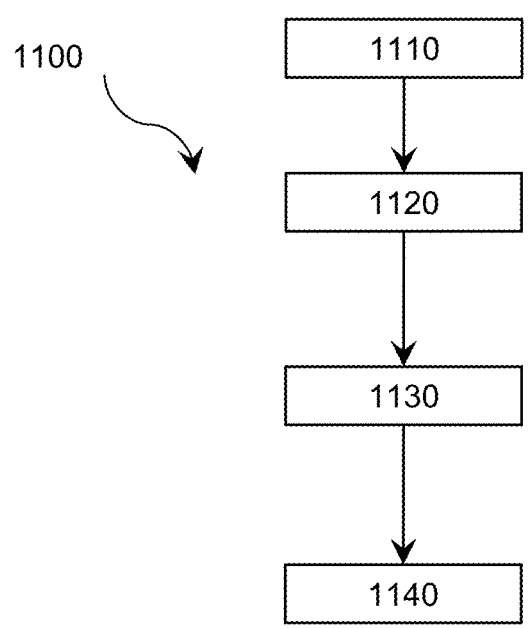
FIG. 11 shows a method for pathogen detection.

The above described embodiments relate generally to systems wherein optics are not diffraction-limited. Referring now to FIGS. 9 to 11, the imaging systems and methods may be performed at the micro- and nano-scale with some variations to the above systems and methods.

For surface inspection below the diffraction limit, systems may be adapted using nano-SSGI, and may not require the use of an ISAI module. Such systems may detect changes at a sub-optical wavelength scale of geometry deviation of a surface along its z axis (i.e. an axis outwardly projecting from an inspected surface). Z-dimension variation may be detected by the aggregation, overlapping and analysis of multiple optical inputs. Further, as described in more detail below, interferometric calibration may be used to overcome computational and optical limits associated with nano-realm imaging. Example surface inspection implementations below the diffraction limit include biological sample surface inspection for the detection of a desired substance, such as a pathogen or indicators of the presence of the pathogens, wherein the pathogen is immobilized in an assembly by antibodies.

In diffraction-limited embodiments, the SSGI module relies on variations of deflectometry, such as microdeflectometry which is a microscopic adaptation of deflectometry. Specifically, microdeflectometry is a modification of Phase-Measuring Deflectometry ("PMD"). Microdeflectometry provides quantitative slope images with lateral resolution better than 1 µm and slope resolution in the range of 1 mrad. A surface height variation of 1 nm may be detected within the diffraction-limited resolution cell of an optical system. The method is incoherent (low noise) and provides an angular range as big as the aperture of the microscope, with high lateral resolution, nanometer sensitivity for local surface features, and quantitative 3D features.

Referring now to FIG. 9, shown therein is an embodiment of an SSGI module 904 for use in diffraction-limited embodiments of system 100. The SSGI module 904 comprises an imaging sensor 156, such as a camera comprising a charge-coupled device ("CCD"), objective lenses 160, and a light emitting screen/panel 150. The object under inspection may be an assembly having a specular surface 156 comprising a pathogen 158 held in place by antibodies 154. In use, light may be projected along a light path 152 from the light emitting screen/panel 150 through lenses 160, and may be detected by the imaging sensor 156.

Referring now to FIG. 10, as described above, z-dimension variation of an imaged sample may be determined by the aggregation, overlapping and analysis of images from multiple imaging data inputs—i.e. from multiple imaging sensors of one or more SSGI modules.

The SSGI module 904 may also incorporate a variation of the software configurable optical test system ("SCOTS"), which uses the same basic test geometry as the fringe reflection technique or phase measuring deflectometry (PMD) and can measure complex three-dimensional specular surfaces. SCOTS may be configured with software for use with the specular surface inspection systems and methods of the present disclosure. SCOTS may utilize reflection deflectometry in measuring the reflected light pattern from that surface of the target object to calculate its shape. In an embodiment, a SCOTS system may operate like a traditional Hartmann test with the light going through in reverse. Particularly, light rays start from a camera aperture, hit a mirror, and reflect to a screen. The screen functions as a detector would in a Hartmann test, and the camera functions as a point source. As the camera images the mirror during the test, information is supplied about the pupil coordinates (measurement positions at the mirror) which correspond to the Hartmann screen hole positions. Each illuminated camera pixel samples a certain region of the test mirror, the region termed the mirror pixel. With a finite size camera aperture, multiple screen pixels can light up the same mirror pixel. SCOTS may provide a non-contact optical test method with high dynamic range with fast data collection which may require only a few seconds. Further, SCOTS may not require a reference surface, is relatively unaffected by environmental issues, and may not be limited to first order by alignment.

Referring now to FIG. 11, the SSGI module 904 may be used according to a method of pathogen detection 1100 for detecting the presence or absence of a pathogen (such as virus, bacteria, fungus and parasites) and human/animal endogenous biomarkers possibly below a scale of 15 nm using fringe reflection techniques and/or phase measuring deflectometry (PMD) techniques, optionally complemented by an interferometric calibration method. More particularly, the method may detect and distinguish viruses, bacteria, protozoa/parasites, and fungi in human/animal saliva, blood, urine, semen, other bodily fluid matrix and be able to detect pathogens and their associated viral proteins and antibodies down to below 10-15 nanometers in the z-axis (which are all referred to generally as pathogens herein). According to the method 1100, at block 1110, a sample is collected. At block 1120, a detection operation may be performed to generate imaging data. At block 1130, imaging data from the detection operation may be analyzed, such as by computing module 116. At block 1140, the sample may be disposed of. The analysis at block 1130 can be based on various methods. For example, two different reference signals can be identified, the first one indicating the presence and the second one the absence of the pathogen. Accordingly, signals obtained for a sample immobilized on an assembly can be compared to reference signals, and a determination can be made as to whether a particular pathogen is present in the sample.

It will be appreciated that the method 1100 can be carried out according to different imaging modalities than the micro-deflectometry modality provided in relation to the illustrated configuration of the SSGI module 904. For example, pathogen detection can be carried out by a surface imaging module comprising a molecular sensing array designed to be sensitive to one or more desired substances (i.e. a pathogen or indicator of the presence of a pathogen). Further, the surface imaging module could be configured to perform Surface-Enhanced Raman Spectroscopy (SERS), Surface Plasmon Resonance (SPR), Surface Plasmon Resonance Imaging (SPRi), Localised Surface Plasmon Resonance (LSPR), Optofluidic Nanoplasmonic, Optical waveguide-based sensing, Optical ring resonator-based sensing, Photonic crystal-based sensing, Nanosensitive OCT sensing, Lensless digital holographic imaging, Superresolution microscopy techniques, piezoelectric sensing, nano-cantilever sensing, Raman spectroscopy (RS), Resonance Raman spectroscopy (RRS), and infrared spectroscopy (IRS). In variations, a surface imaging module could be configured to perform interferometer-based detection, such as by using a Mach-Zehnder Interferometer, Young's interferometer, Hartman interferometer, Interferometric scattering microscopy (iSCAT), Single Particle Interferometric Reflectance Imaging (SPIRIS) and backscattering interferometry. Other imaging modalities based on other detection techniques should now occur to a person of skill and are contemplated.

Further embodiments will now be described relating to variations of the above systems and methods implementing machine-learning processing techniques. Machine-learning implemented processing techniques, particularly making use of neural networks, may facilitate: image data analysis, optionally for generating a multi-dimensional model of a surface under inspection; denoising imaging data, such as at block 212 of method 200; and, imaging calibration. These embodiments may be carried out by local computing module 116, and/or by remote computing module 114.

In an embodiment, the detection of surface defects and other evaluation of the object's surface topology can be based on computational modules. Computational modules can be implemented using any computational paradigm capable of performing data analysis based on various methods such as regression, classification and others. In some variations, the computational modules can be learning based. One learning based computational paradigm capable of performing such methods may be a neural network. Neural networks may include Restricted Boltzmann Machines, Deep Belief Networks, and Deep Boltzmann Machines. Accordingly, a neural network can be used to detect the presence or absence of a surface defect or irregularity in the surface of a target object by the ISAI module 118 and/or SSGI module 104. Thus, imaging data from the ISAI module 118 and/or SSGI module 104, as well as relevant data from databases and other services, can be provided to a neural network, which can perform detection based on classification/regression or similar methods.

The above listed machine-learning implemented processing techniques may be implemented by providing imaging data as input data to a neural network, such as a feed-forward neural network, for generating at least one output. The neural networks described below may have a plurality of processing nodes, including a multi-variable input layer having a plurality of input nodes, at least one hidden layer of nodes, and an output layer having at least one output node. During operation of a neural network, each of the nodes in the hidden layer applies a function and a weight to any input arriving at that node (from the input layer or from another layer of the hidden layer), and the node may provide an output to other nodes (of the hidden layer or to the output layer). The neural network may be configured to perform a regression analysis providing a continuous output, or a classification analysis to classify data. The neural networks may be trained using supervised or unsupervised learning techniques, though supervised learning techniques may be described below for clarity of illustration. According to a supervised learning technique, a training dataset is provided at the input layer in conjunction with a set of known output values at the output layer. During a training stage, the neural network may process the training dataset. It is intended that the neural network learn how to provide an output for new input data by generalizing the information it learns in the training stage from the training data. Training may be effected by backpropagating error to determine weights of the nodes of the hidden layers to minimize the error. The training dataset, and the other data described herein, can be stored in a database connected to module 116 or otherwise accessible to remote module 114. Once trained, or optionally during training, test data can be provided to the neural network to provide an output. A neural network may thus cross-correlate inputs provided to the input layer in order to provide at least one output at the output layer. Preferably, the output provided by a neural network in each embodiment will be close to a desired output for a given input, such that the neural network satisfactorily processes the input data.

Particularly, variations of the present disclosure may include signal processing of ISAI and/or SSGI imaging data by machine learning techniques (e.g. neural networks) according to binary classification or defect classification modalities. In a binary classification modality, a computational module detects only the presence or absence of a defect in the surface being inspected, represented in the imaging data. A computational module employing a binary detection modality may utilize machine learning techniques such as feature engineering (e.g. Gabor filters, image processing algorithms, Gaussian wavelet) or supervised learning (e.g. LSTM), or other appropriate techniques. Alternatively, a defect classification modality may be used, wherein the computational module identifies a defect of a particular type or class based on the imaging data collected from the surface under inspection.

In some variations, the neural network can operate in at least two modes. In a first mode, a training mode, the neural network can be trained (i.e. learn) based on known surfaces containing the known presence or absence of a defect. The training typically involves modifications to the weights and biases of the neural network, based on training algorithms (backpropagation) that improve its detection capabilities. In a second mode, a normal mode, the neural network can be used to detect a defect in the surface of a target object under inspection. In variations, some neural networks can operate in training and normal modes simultaneously, thereby both detecting the presence or absence of a defect in the surface of a given target object, and training the network based on the detection effort performed at the same time to improve its detection capabilities. In variations, training data and other data used for performing detection services may be obtained from other services such as databases or other storage services. Some computational paradigms used, such as neural networks, involve massively parallel computations. In some implementations, the efficiency of the computational modules implementing such paradigms can be significantly increased by implementing them on computing hardware involving a large number of processors, such as graphical processing units.

Figure 12:
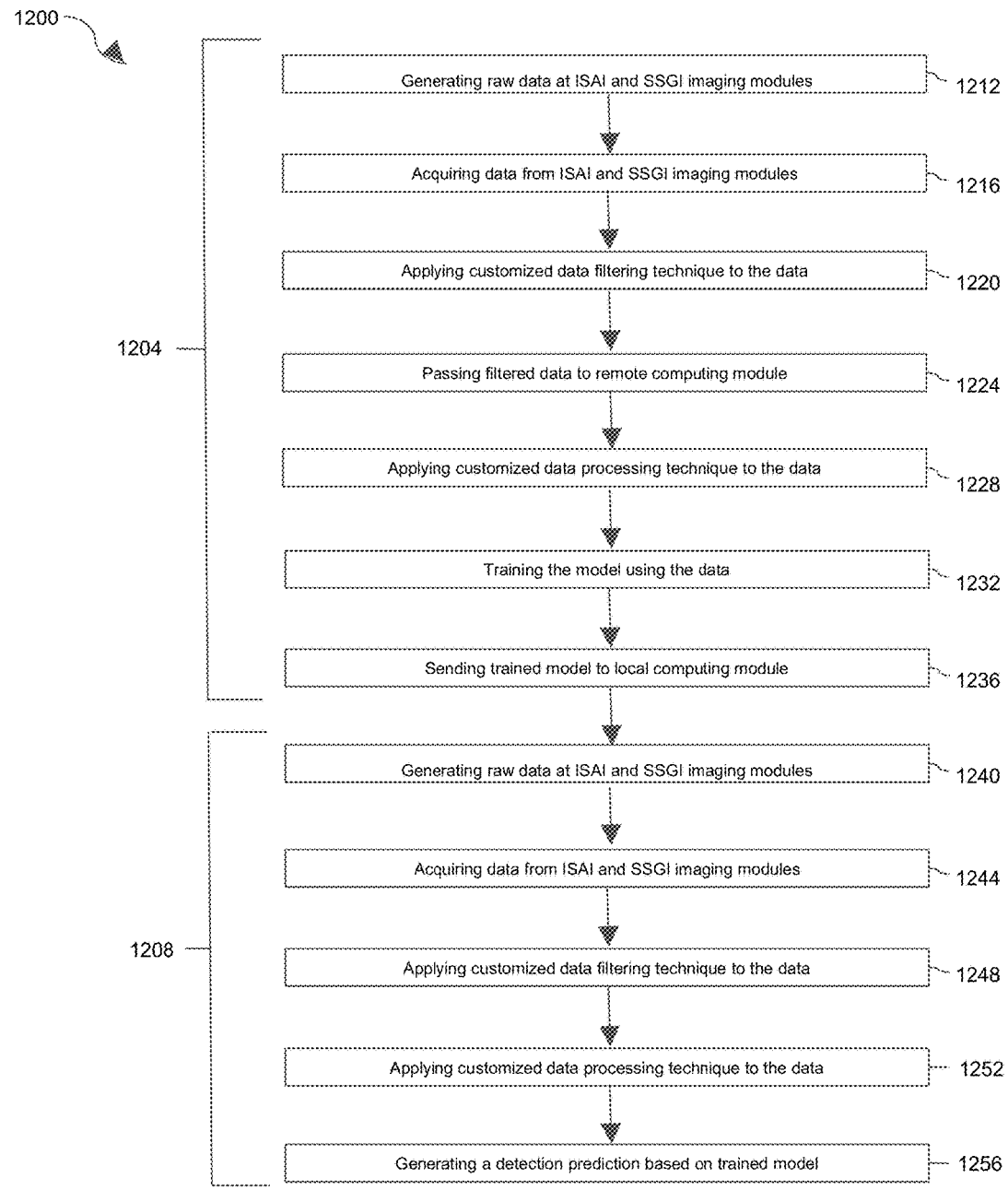
FIG. 12 shows a method for inspecting a surface using a neural network, in accordance with an embodiment.

Referring now to FIG. 12, shown therein is a method 1200 for imaging and inspecting a surface for defects using a neural network, in accordance with an embodiment. Some or all steps of method 1200 involving processing and analysis of imaging data may be carried out at the computing module, such as local computing module 116 or remote computing module 114. The method 1200 shows both a training mode 1204 and a normal mode 1208 which, in some embodiments, may operate simultaneously. At 1212, the ISAI and SSGI modules generate raw data comprising a one dimensional swath and specular reflection of the object, respectively. In variations, the ISAI module 118 and/or SSGI module 104 comprise a plurality of imaging sensors, for example for imaging from multiple perspectives. At 1216, the raw data is received from the ISAI module 118 and SSGI modules 104 by the computing module. In some variations, acquisition of raw data may occur at local computing module 116. In other implementations, data can be acquired from the local computing module 116 by remote computing module 114 via a network. At 1220, once data is acquired, customized data filtering techniques can be applied to the raw data at the computing module. At 1224, filtered data can be passed to a remote computing module 114 where, at 1228, customized data processing techniques can be applied to the filtered data. Data filtering and processing may be carried out according to filtration and processing techniques known in the art. As illustrated, at 1232 the processed and filtered data is used as input in training a model, for example a classification model, using a computational module such as a neural network. In training the model, training data may be labelled and used as reference data and feature extraction techniques carried out, such as in a supervised learning technique. In other embodiments, training of a model may be achieved by unsupervised (or semi-supervised) learning techniques. At 1236, the trained model is sent to local computing module 116, for use in normal mode 1208. In alternate embodiments, training may be achieved at the local computing module, and the trained model uploaded to the remote computing module 114, which may serve to minimize or reduce data uploading requirements. As illustrated, having a trained model and operating in normal mode 1208, at 1240 raw data is generated at the ISAI and SSGI modules. At 1244, the raw data can be acquired from the ISAI and SSGI modules by the computing module. The local computing module 116 may include a real-time decision module to which the trained model can be sent, to be used in generating a determination of the presence or absence of surface defects or irregularities. At 1248 and 1252, customized filtering and processing techniques are applied to the raw data. At 1256, a detection prediction corresponding to the presence or absence of a defect in the surface is generated based on the trained model. The prediction or determination can be sent to a user interface for viewing. After the processed data has been applied to the trained model at the computing module (e.g. at the real-time decision module), the prediction/determination may be stored locally on the local computing module 116. Locally stored data may be sent from the local computing module 116 to the remote computing module 114 for reporting/archiving.

Classification should be understood in a larger context than simply to denote supervised learning. By classification process we convey: supervised learning, unsupervised learning, semi-supervised learning, active/groundtruther learning, reinforcement learning and anomaly detection. Classification may be multi-valued and probabilistic in that several class labels may be identified as a decision result; each of these responses may be associated with an accuracy confidence level. Such multi-valued outputs may result from the use of ensembles of same or different types of machine learning algorithms trained on different subsets of training data samples. There are various ways to aggregate the class label outputs from an ensemble of classifiers; majority voting is one method.

Embodiments of the systems and methods of the present disclosure may implement groundtruthing to ensure classification result accuracy according to an active learning technique. Specifically, results from classification models may be rated with a confidence score, and high uncertainty classification results can be pushed to a groundtruther to verify classification accuracy. Optionally, classification outputs can periodically be provided to groundtruthers to ensure accuracy. In some implementations, a determination by the system indicative of the presence of a defect may result in generating a request for human groundtruthing of the detection signal or the target surface from which the detection signal was generated.

In variations, surface defect detection using a neural network or clustering mechanism can be an ongoing process. For example, in some implementations, the computing module can be a local computing module and provide results to a remote computing module. The remote computing module can include appropriate learning mechanisms to update a training model based on the newly received signals. For example, the remote computing module can be a neural network based system implemented using various application programming interfaces APIs and can be a distributed system. The APIs included can be workflow APIs, match engine APIs, and signal parser APIs, allowing the remote computing module to both update the network and determine whether a defect is present or absent in the target surface based on the received signal.

According to a further embodiment, machine learning techniques may be applied in order to improve denoising of imaging data. Particularly, a neural network may be trained to denoise imaging data for a given pattern of noise, saturation, such as vibration, acceleration, direction etc. Particularly, a motion vector and imaging data may be provided to a neural network at its input layer, with a desired output compensating for defects in the imaging data that may be caused by the motion of the target object (and surface) for the motion vector. The neural network may be trained such that the output layer provides clean imaging data compensating for motion and saturation defects. The neural network may be trained with a training dataset comprising, at the input layer, imaging data comprising motion and saturation defects and associated motion vectors, and with associated clean imaging data at the output layer, free of motion and saturation defects. Accordingly, such a trained neural network learns a pattern of defects exhibited in the presence of a given motion vector, in order to generate clean imaging data as the output, free of motion and saturation defects.

Though the above described embodiments, such as at blocks 206 and 212 of method 200, comprise geometric, mathematical and numerical imaging data processing techniques for processing imaging data, in some embodiments, machine learning techniques may alternatively or additionally be applied in order to improve analysis of imaging data, optionally through the use of trained neural networks to analyze imaging data to generate a multi-dimensional model of the surface from imaging data. According to an embodiment, a neural network analyzes imaging data received from the ISAI module and/or the SSGI module. The neural network may receive component or aggregate imaging data as an input and may be trained to output an indication of whether the imaging data relates to a reference signal indicating the presence of a surface defect (or pathogen), or a reference signal indicating the absence of a surface defect (or pathogen). Accordingly, during use, at least imaging data or scaled or otherwise modified representations thereof, will be provided to the neural network as an input. Optionally, additional data may be provided to the input layer of the neural network to assist in interpreting received imaging data. Combinations of data could be provided at the input layer, including: surface type and object geometry. This embodiment may thus cross-correlate various inputs to provide an output to aid in interpreting imaging data to determine whether a surface defect has been detected. Optionally, subsets of imaging data could be provided to the neural network for a particular area of an object under inspection, and each subset may be processed in order to determine the presence or absence of a defect. In conjunction with positioning data relating to each subset, a model may be generated from the outputs for each dataset in order to provide the surface geometry of the object and indicating the presence of any located defects along the geometry. Accordingly, processing the imaging data can be structured as a classification problem in order to determine whether some areas of an object disclose the presence or absence of a defect (or pathogen), and further in order to generate a model of the object.

According to a further embodiment, machine learning techniques may be applied in order to improve denoising of imaging data, such as at block 212 of method 200. Particularly, a neural network may be trained to denoise imaging data for a given pattern of noise (vibration, acceleration, direction etc.). Particularly, a motion vector and imaging data may be provided to a neural network at its input layer, with a desired output compensating for defects in the imaging data that may be caused by the motion of the object under inspection for the motion vector. The neural network may be trained such that the output layer provides clean imaging data compensating for motion defects. Particularly, the neural network may be trained with a training dataset comprising, at the input layer, imaging data comprising motion defects and associated motion vectors, and with associated clean imaging data at the output layer, free of motion defects. Accordingly, such a trained neural network learns a pattern of defects exhibited in the presence of a given motion vector, in order to generate clean imaging data as an output, free of motion defects.

According to a further embodiment, machine learning techniques may be applied in order to perform calibration, particularly for diffraction-limited embodiments. Specifically, a neural network may be applied to imaging data in order to compensate for micro-/nano-realm imaging limitations. Particularly, imaging data is provided to a neural network at the input layer, with a desired output compensating for defects in the imaging data that may be caused by limitations of imaging in the micro-/nano-realm. In addition to imaging data having micro-/nano-realm defects, the input layer may receive data relating to the configuration of the imaging system and the type of defect (or pathogen) being detected. The neural network may be trained such that the output layer provides clean imaging data compensating for defects. Particularly, the neural network may be trained with a training dataset comprising, at the input layer, imaging data comprising defects, and with associated clean imaging data at the output layer for various detection modalities. The output of the trained neural network may thus provide a processed detection signal similar to known reference signals such that processing by the neural network remedies some defects and limitations of received imaging data may be alleviated.

The above-described implementations are intended to be examples and alterations and modifications may be effected thereto, by those of skill in the art, without departing from the scope which is defined solely by the claims appended hereto. For example, methods, systems and embodiments discussed can be varied and combined, in full or in part.

Thus, specific specular surface inspection systems and methods have been disclosed. It should be apparent, however, to those skilled in the art that many more modifications besides those already described are possible without departing from the inventive concepts herein. The subject matter of the present disclosure, therefore, is not to be restricted except in the spirit of the disclosure. Moreover, in interpreting the present disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A surface inspection system for imaging an object in motion comprising:
    an inverse synthetic aperture imaging ("ISAI") module for generating ISAI imaging data comprising a one-dimensional swath of pixels for the object;
    a specular surface geometry imaging ("SSGI") module for generating SSGI imaging data comprising a specular reflection of the object; and
    a computing device for:
        aggregating the ISAI imaging data and the SSGI imaging data into aggregated imaging data;
        denoising the aggregated imaging data; and
        determining the presence or absence of a surface defect in the aggregated imaging data.

2. The system of claim 1, wherein the computing device comprises a neural network for receiving input imaging data at an input layer, the input data comprising the ISAI imaging data and the SSGI imaging data, or the aggregated imaging data, and the neural network generating the determination at an output layer.

3. The system of claim 2, wherein the neural network is trained with a training dataset comprising the input imaging data, the input imaging data comprising motion defects and associated motion vectors, and output imaging data at the output layer, the output imaging data comprising associated clean imaging data free of motion defects.

4. The system of claim 2, wherein the neural network is trained to denoise the aggregated imaging data for a given pattern of noise.

5. The system of claim 4, wherein the given pattern of noise comprises at least one of vibration, acceleration, and direction.

6. The system of claim 1, wherein denoising the imaging data comprises using additional dimensional information about the object from at least one of the SSGI module, an image stabilization mechanism, and a reference bar.

7. The system of claim 1, wherein denoising the aggregated imaging data comprises application of processing techniques to the imaging data, the processing techniques comprising at least one of a Fourier transform, a wavelet transform, filtering, thresholding, and edge detection.

8. The system of claim 1, wherein the computing device is communicatively linked to a cloud based platform for facilitating a multi-stage inspection operation.

9. The system of claim 1, wherein the computing device is communicatively linked to a cloud based platform for invoking services comprising reporting and analysis.

10. The system of claim 1, wherein an output generated in response to the determination effects a state change in a workflow operation using operational states.

11. A method of specular surface inspection of an object in motion, the method comprising:
- imaging the object with an inverse synthetic aperture imaging ("ISAI") module having at least one imaging sensor, the ISAI module configured to generate ISAI imaging data comprising a one-dimensional swath of pixels;
- imaging the object with a specular surface geometry imaging ("SSGI") module, the SSGI module configured to generate SSGI imaging data comprising a specular reflection of the object;
- transmitting the ISAI imaging data from the ISAI module and the SSGI imaging data from the SSGI module to a computing device, the computing device configured to process the ISAI imaging data and the SSGI imaging data;
- aggregating the ISAI imaging data and the SSGI imaging data into aggregated imaging data;
- denoising the aggregated imaging data;
- analyzing the aggregated imaging data to generate a determination of the presence or absence of a surface defect; and
- generating an output in response to the determination.

12. The method of claim 11, wherein at least one of denoising the aggregated imaging data, analyzing the denoised imaging data, and generating an output are carried out on a computing device.

13. The method of claim 11, further comprising applying a neural network based classification process to the aggregated imaging data.

14. The method of claim 11, wherein the computing device comprises a neural network for receiving the ISAI imaging data and the SSGI imaging data, or the aggregated imaging data, at an input layer and for generating the determination at an output layer.

15. The method of claim 14, further comprising training the neural network to provide, at the output layer, clean aggregated imaging data compensating for motion defects.

16. The method of claim 15, wherein the training uses a training dataset comprising input imaging data at the input layer, the input imaging data comprising the ISAI imaging data, the SSGI imaging data, or both, or the aggregated imaging data, the input imaging data further comprising a motion defect and an associated motion vector.

17. The method of claim 11, wherein denoising the aggregated imaging data comprises applying processing techniques to the aggregated imaging data, the processing techniques comprising at least one of a Fourier transform, a wavelet transform, filtering, thresholding, and edge detection.

18. The method of claim 11, wherein denoising the aggregated imaging data comprises using a neural network to learn a pattern of noise caused by the object in motion.

19. The method of claim 18, wherein the pattern of noise comprises at least one of vibration, acceleration, and direction.

20. The method of claim 11, further comprising cross-correlating the ISAI imaging data, the SSGI imaging data, or both, from multiple stages of a multi-stage inspection operation.

21. The method of claim 20, wherein the multiple stages comprise a primer inspection, a paint inspection, and a final inspection.

22. The method of claim 11, further comprising identifying the relative position of the surface defect on the object.

23. The method of claim 11, wherein the output generated in response to the determination effects a state change in a workflow operation using operational states.

* * * * *